July 1, 1930.  C. BRADBERRY  1,768,540
GASOLINE MOTOR
Filed March 11, 1929   2 Sheets-Sheet 1

Claud Bradberry, INVENTOR

BY Victor J. Evans ATTORNEY

Claud Bradberry,
INVENTOR

BY Victor J. Evans
ATTORNEY

Patented July 1, 1930

1,768,540

UNITED STATES PATENT OFFICE

CLAUD BRADBERRY, OF CLINTON, KENTUCKY

GASOLINE MOTOR

Application filed March 11, 1929. Serial No. 346,246.

This invention relates to internal combustion engines. It is an object of the invention to provide a novel design of motor which combines the advantageous features of the valve-in-head motor with the features of the ordinary valve-in-side motor.

Toward this end, the invention contemplates the provision of the ordinary cylinder block and head. Provision is made whereby the exhaust valves are mounted in the cylinder head directly over the cylinder and these exhaust valves are substantially as large in diameter as the diameter of the cylinders themselves. The intake valves are mounted in the usual manner in the cylinder block, each valve being mounted adjacent its respective cylinder being operated by a common shaft in the lower portion of the block.

The provision of the above features permits the intake valve to be made comparatively large without a corresponding weakening of the valve and cylinder walls. Means is provided whereby an instantaneous exhaust may be accomplished by virtue of the size of the exhaust valves, the exhaust chamber and the exhaust manifold, the diameter or width, as the case may be of these latter elements being substantially the same as the diameter of the cylinders themselves, and the size of the combustion chamber may be greatly reduced resulting in a very high compression. In addition to these advantages the invention contemplates a motor which is extremely compact and which is strong and durable. Efficiency of operation, comparative inexpense of manufacture and the provision of a minimum number of movable parts are further desirable features that have been borne in mind in the production and development of this invention.

One embodiment of the invention has been shown in the accompanying two sheets of drawings in which:—

Figure 1:
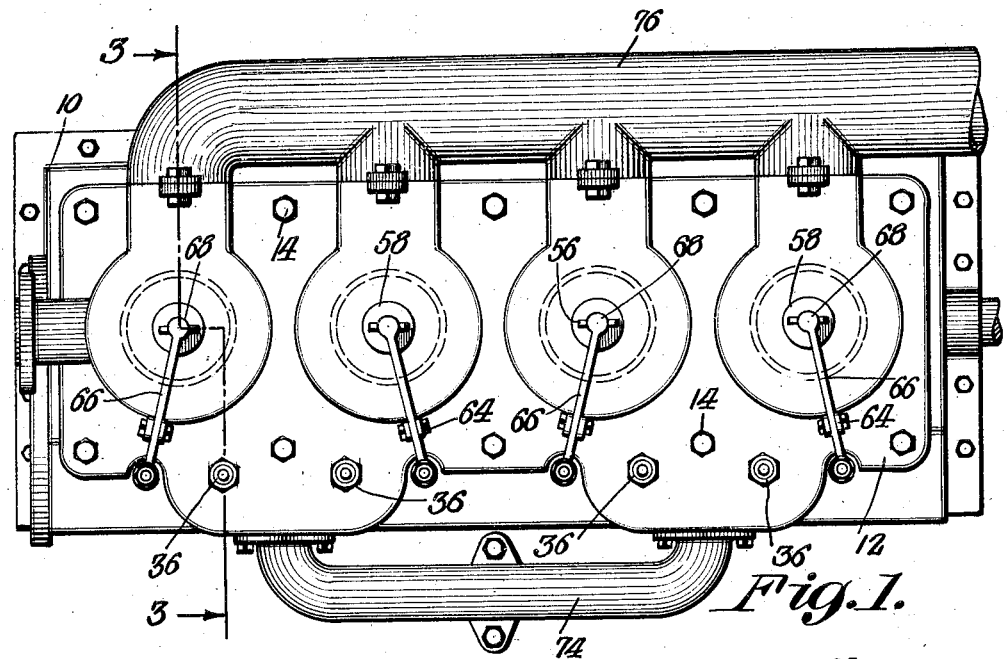
Figure 1 is a top plan view of an internal combustion engine in describing the principle of this invention.
Figure 2:
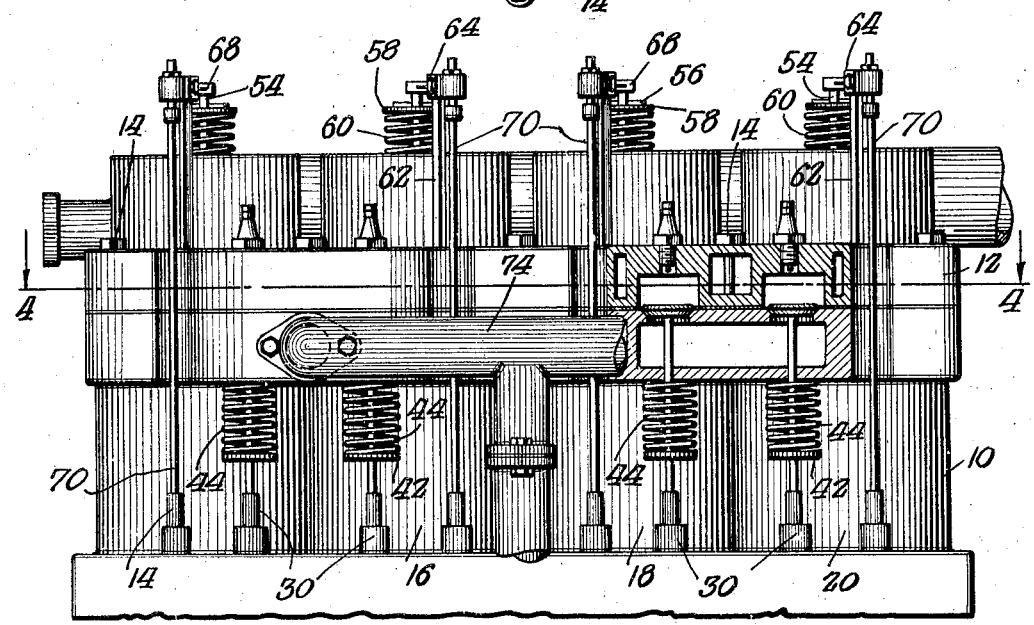
Figure 2 is a side view of the engine, certain parts being broken away to more clearly reveal the nature of the same.

In all of the above mentioned views, like characters of reference are employed to designate like parts thruout and the motor involves in its general organization a cylinder block 10 having a head 12 secured thereto in the usual manner by means of cap screws 14 extending thru the head 12 and threaded into the block 10. The block 10 is provided with the usual cylinders 15, 16, 18 and 20. The head 12 recessed at 22 to provide the usual combustion chamber for the mixing and explosion of gases.

Intake valves are shown at 26 and these intake valves are provided with valve rods 28 extending thru the cylinder block to contact with valve rods 30 slidably mounted on a common cam shaft 32 geared to the crank shaft 34 in any suitable manner. Spark plugs 36 are threaded in the cylinder head 12 above each valve, and are of course adapted to be in electrical connection with a suitable source of electrical energy so as to ignite the charge in the usual manner. Each valve stem 28 has a pin 40 extending therethru on which pin there rests a valve plate 42 between which plate and the cylinder block there is disposed a coil spring 44 for the purpose of maintaining the valves on their seats. The arrangement of the intake valves on the side of the block is not novel and no claim is made as to this arrangement of parts in itself. Only in so far as this position of the intake valves is concerned with the remaining arrangement of parts of the motor in combination, does the novelty of the invention reside.

The cylinder head 12 is provided with valve seats 50 on which the overhead exhaust valves 52 are disposed. These valves are provided with stems 54 extending upwardly through the cylinder head. Each stem is provided with a pin 56 extending therethrough which pin serves to support valve plates 58 therebeneath and between which plate and cylinder head 12 are disposed coil springs 60 to maintain the valves on their seats. Supporting rods 62 are mounted on the cylinder head. The upper ends of these rods are bifurcated at 64 and pivotally support rocker arms 66 which bear against the valve stems 54 at 68 at one end thereof. The other ends of the rocker arms 66 are provided with collars 68 adjustably mounted on push rod 70 that bear against cam surfaces on the cam shaft 32.

The intake chamber is shown at 70 and occupies the position in the cylinder block below the valves 26. The exhaust chamber is designated at 72 and this chamber occupies a position in the cylinder head above the valves 52. The intake chamber is connected to the usual intake manifold 74 and the exhaust chamber 72 is connected to the usual exhaust manifold 76 secured to the cylinder head in any suitable manner.

Figure 3:
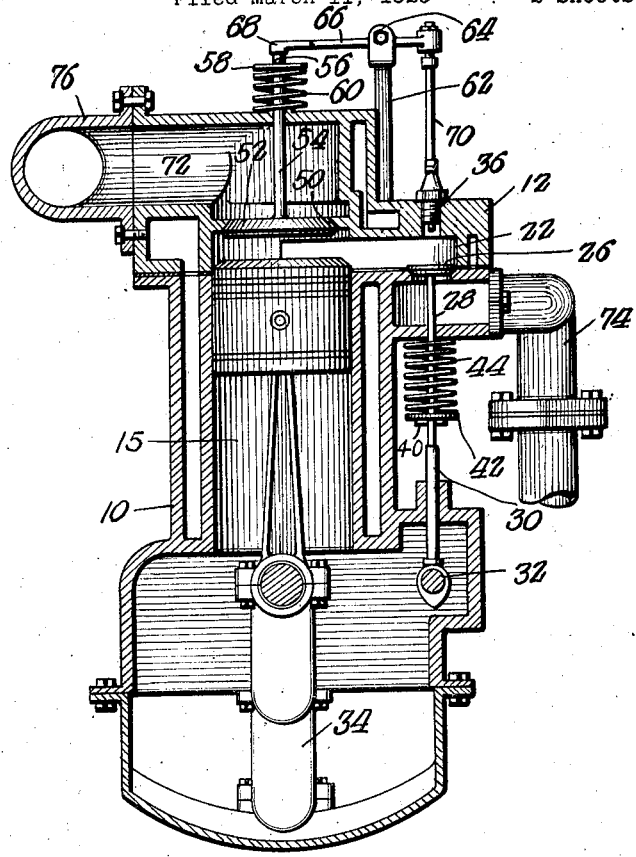
Figure 3 is a sectional view taken substantially along the line 3—3 of Figure 1.
Figure 4:
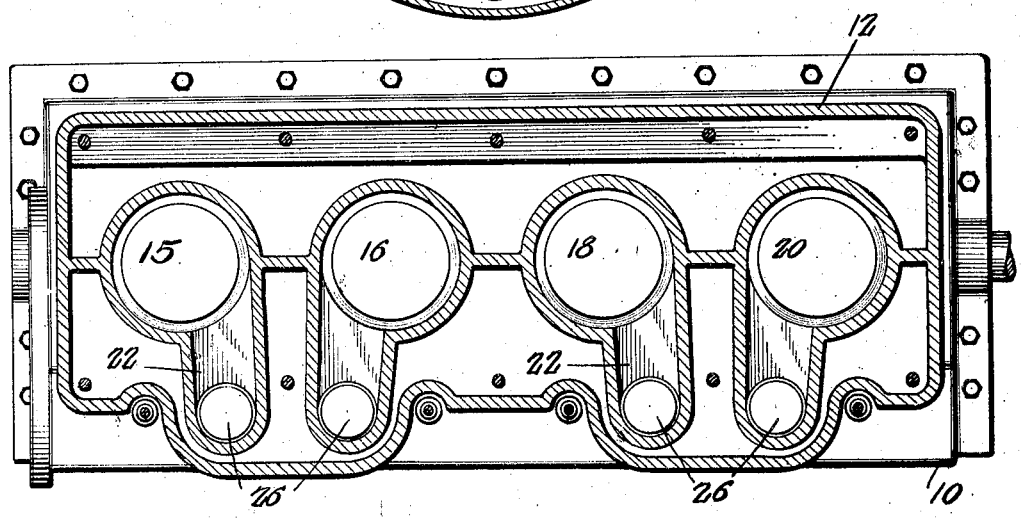
Figure 4 is a sectional view taken substantially along the line 4—4 of Figure 2.

The operation of the motor can be readily understood from an inspection of Figure 3. The engine is of the ordinary four cycle internal combustion engine and the cam shaft 32 is so arranged that the intake valves 26 will open when the piston is at the top of its stroke to permit fuel mixture to be drawn into the cylinders.

As the piston reaches the bottom of its stroke, this valve will close so that on the upstroke these gases may be compressed. The spark plugs are shown at S and these plugs are adapted to fire in the cylinder at the point of maximum compression. After the power stroke, the exhaust valves open and because these valves are substantially as large as the bore of the cylinder itself, little or no compression is offered when the gases are being exhausted and consequently compression losses due to exhaust pressure are negligible. It is obvious then that a motor has been provided which is designed for maximum power with a minimum of exhaust compression loss. The device is compact in its construction and may be readily disassembled for the purpose of inspection and repair.

It is to be particularly understood that I do not desire to be limited to the exact arrangement of parts shown in the accompanying drawings and described in the present specification. Various changes are contemplated in the details of construction without sacrificing any of the advantages contemplated. Only in so far as I have particularly pointed out my invention in the appended claim do I desire to be limited.

While the invention has been shown in connection with the ordinary four cycle, four cylinder engine, the details of construction may be altered to adapt the principle of the invention to use in a motor having six, eight or more cylinders as desired.

By the arrangement of the valves as above described and shown in the drawings, it will be obvious that the advantage of the extra space which the intake valves occupy in engines now in general use is gained, and by this arrangement only can extra large exhaust valves be used, which of course give greater power, speed and efficiency in operation.

What is claimed is:—

An internal combustion engine including cylinders having pistons, intake valves to control fuel to the cylinders and located to one side thereof, a head for the cylinders and having exhaust ports located directly over the pistons, and of a diameter substantially equal to the diameter of the cylinders, exhaust valves for controlling the exhaust ports and located directly over the pistons to permit the burnt gases to quickly escape from the cylinders when the exhaust valves are open, and ignition means located directly over the intake valves.

In testimony whereof I affix my signature.

CLAUD BRADBERRY.